(12) United States Patent
Asbi et al.

(10) Patent No.: US 10,819,581 B2
(45) Date of Patent: Oct. 27, 2020

(54) PERFORMANCE ANALYTICS CONTENT GALLERY

(71) Applicant: ServiceNow, Inc., Santa Clara, CA (US)

(72) Inventors: Nabil Asbi, The Hague (NL); Ong-Aat Rutten, Amsterdam (NL)

(73) Assignee: ServiceNow, Inc., Santa Clara, CA (US)

( * ) Notice: Subject to any disclaimer, the term of this patent is extended or adjusted under 35 U.S.C. 154(b) by 302 days.

(21) Appl. No.: 15/946,380

(22) Filed: Apr. 5, 2018

(65) Prior Publication Data

US 2019/0312789 A1    Oct. 10, 2019

(51) Int. Cl.
| | | |
|---|---|---|
| *H04L 12/24* | (2006.01) | |
| *G06F 8/61* | (2018.01) | |
| *G06F 16/951* | (2019.01) | |
| *H04L 29/08* | (2006.01) | |

(52) U.S. Cl.
CPC ........... *H04L 41/14* (2013.01); *G06F 8/61* (2013.01); *G06F 16/951* (2019.01); *H04L 41/22* (2013.01); *H04L 41/0813* (2013.01); *H04L 41/20* (2013.01); *H04L 41/28* (2013.01); *H04L 67/1095* (2013.01)

(58) Field of Classification Search
CPC ....... H04L 41/22; H04L 41/18; H04L 43/045; H04L 43/08; H04L 43/06
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |

(Continued)

*Primary Examiner* — Nam T Tran
(74) *Attorney, Agent, or Firm* — Fletcher Yoder, P.C.

(57) ABSTRACT

A system and method for configuring a performance analytics (PA) software application is disclosed. The system may be disposed within a computational instance of a remote network management platform that remotely manages a managed network. The system may include a database of content plugins for configuring respective key performance indicator (KPI) modules, each implementing PA applied to an associated KPI of the managed network. Configuring the KPI modules may specify respective graphical configurations of a dashboard for displaying graphical representations of the associated KPI in a graphical user interface (GUI) within the managed network. A gallery of icons each identifying a plugin may be displayed in, and selected from, the GUI. A selected plugin may then be installed via a common plugin interface, whereby an associated KPI module becomes configured and ready for execution.

20 Claims, 12 Drawing Sheets

(56) References Cited

U.S. PATENT DOCUMENTS

| | | |
|---|---|---|
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 2016/0105335 A1* | 4/2016 | Choudhary ............. H04L 41/22 |

* cited by examiner

PERFORMANCE ANALYTICS CONTENT GALLERY

BACKGROUND

Managed networks may include various types of computer networks that can be remotely administered. This management may involve one or more computing devices disposed with a remote network management platform collecting information about the configuration and operational states of software applications executing on behalf on the managed network, and then presenting representations of this information by way of one or more user interfaces. The user interfaces may be, for instance, web-based user interfaces. In some instances, remote management of networks may be provided by a third party, such as a service provider or vendor.

Some of the collected information may relate to key performance indicators (KPIs). KPIs include any sort of measurement, reading, or data that is relevant to the managed network. Thus, KPIs may reflect performance of computing devices on the network itself (e.g., memory utilization, processor utilization, transactions per second) or performance of higher-level applications executing on the remote network management platform (e.g., a number of times per day that users on the managed network have requested a particular type of technical assistance). Among other capabilities, the user interfaces may be able to display KPIs in numerous visualizations, such as charts, graphs, or tables.

The user interfaces and supporting applications that provide for monitoring, analysis, and visualization of KPIs may be implemented as a specific facility or environment within an overall remote network management system. As such, a network management service provider or system vendor may be interested in how such a facility or environment is packaged within the overall management system. For example, the service provider or vendor may want to provide features and functions as a tiered offering, with different levels available according pricing, for example. The service provider or vendor may also want to consider factors such as support of the monitoring and analysis system, including update procedures. Other aspects may be of interest to the service provider or vendor as well.

SUMMARY

In order to provide a monitoring and analysis system in a tiered offering, a service provider or vendor may implement monitoring, analysis, and visualization of KPIs within an overall remote network management system as a Performance Analytics (PA) application program with extendable features and capabilities. In particular, the inventors have recognized that a PA application may be offered in a default configuration that includes functionality for monitoring, analyzing, and visualizing a default set of one or more basic KPIs, and may further be expandable to functionality for additional sets of KPIs. The basic and expanded functionality then facilitates a framework for tiers or levels that may be priced accordingly for customers. Herein, a customer may be an enterprise, organization, or business, for example, that purchases or licenses remote network management as a service from the service provider or vendor.

The inventors have further recognized that there are a number of technical challenges to developing and deploying a PA application within a remote network management system. These include: organization of KPI sets and their associated programmatic implementations; accommodation of customer needs to ensure that end users can invoke actions to extend the basic PA application; convenience and efficiency of extending the PA application, taking account of the likely types of end users that will endeavor to extend the PA application; robustness to system updates, such that the service provider or vendor can effectively and correctly validate updates before they are rolled out; and stability of the customer's configurations in the face of system updates, such that configurations are not disrupted, for example. To address these, and other possible challenges, sets of one or more KPIs may be implemented as "configuration plugins," and organized in a "gallery" that helps customers quickly and efficiently discover PA capabilities they may be looking for, and/or ones they might not necessarily have considered in the absence of the organizational advantages of a gallery.

Accordingly, a first example embodiment may involve a system for configuring a performance analytics (PA) software application, wherein the system is disposed within a computational instance of a remote network management platform that remotely manages a managed network, the system comprising: a database containing a plurality of configuration plugins, each comprising content data for configuring a respective key performance indicator (KPI) application module, wherein each respective KPI application module implements performance analytics applied to an associated KPI of the managed network, and wherein configuring the respective KPI application module specifies a graphical configuration of a dashboard for displaying graphical representations of the associated KPI in a graphical user interface (GUI) within the managed network; and a computing device operational to execute both the PA software application and a PA-configuring software program, wherein the PA-configuring software program is configured to: display, in the GUI, a gallery of graphical identifiers, each identifying a respective one of the plurality of configuration plugins, receive, via the GUI, input selecting one of the graphical identifiers, the selected graphical identifier identifying a particular configuration plugin, install in the PA software application, via a common plugin interface, the particular configuration plugin, and configure a particular KPI application module corresponding to the particular configuration plugin by writing the content data of the particular configuration plugin to corresponding data definitions of the particular KPI application module.

A second example embodiment may involve a method for configuring a performance analytics (PA) software application, wherein the method is carried out by a computing device disposed within a computational instance of a remote network management platform that remotely manages a managed network, and wherein the computing device is operational to execute the PA software application, the method comprising: in a graphical user interface (GUI) within the managed network, displaying a gallery of graphical identifiers, each identifying a respective one of a plurality of configuration plugins contained in a database disposed within the computational instance of the remote network management platform, wherein each of the plurality of configuration plugins comprises content data for configuring a respective key performance indicator (KPI) application module of the PA software application, wherein each respective KPI application module implements performance analytics applied to an associated KPI of the managed network, and wherein configuring the respective KPI application module specifies a graphical configuration of a dashboard for displaying graphical representations of the associated KPI in the GUI; receiving, via the GUI, input selecting one of the graphical identifiers, the selected graphical identifier identifying a particular configuration plugin; installing in the PA software application, via a common plugin interface, the particular configuration plugin, and configuring a particular KPI application module corresponding to the particular configuration plugin by writing the content data of the particular configuration plugin to corresponding data definitions of the particular KPI application module.

In a third example embodiment may involve an article of manufacture including a non-transitory computer-readable medium having stored thereon program instructions for configuring a performance analytics (PA) software application, wherein a computing device operational to execute the PA software application is disposed within a computational instance of a remote network management platform that remotely manages a managed network, and wherein the program instructions, upon execution by the computing device, cause the computing device to perform operations comprising: in a graphical user interface (GUI) within the managed network, displaying a gallery of graphical identifiers, each identifying a respective one of a plurality of configuration plugins contained in a database disposed within the computational instance of the remote network management platform, wherein each of the plurality of configuration plugins comprises content data for configuring a respective key performance indicator (KPI) application module of the PA software application, wherein each respective KPI application module implements performance analytics applied to an associated KPI of the managed network, and wherein configuring the respective KPI application module specifies a graphical configuration of a dashboard for displaying graphical representations of the associated KPI in the GUI; receiving, via the GUI, input selecting one of the graphical identifiers, the selected graphical identifier identifying a particular configuration plugin; installing in the PA software application, via a common plugin interface, the particular configuration plugin, and configuring a particular KPI application module corresponding to the particular configuration plugin by writing the content data of the particular configuration plugin to corresponding data definitions of the particular KPI application module.

In a fourth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
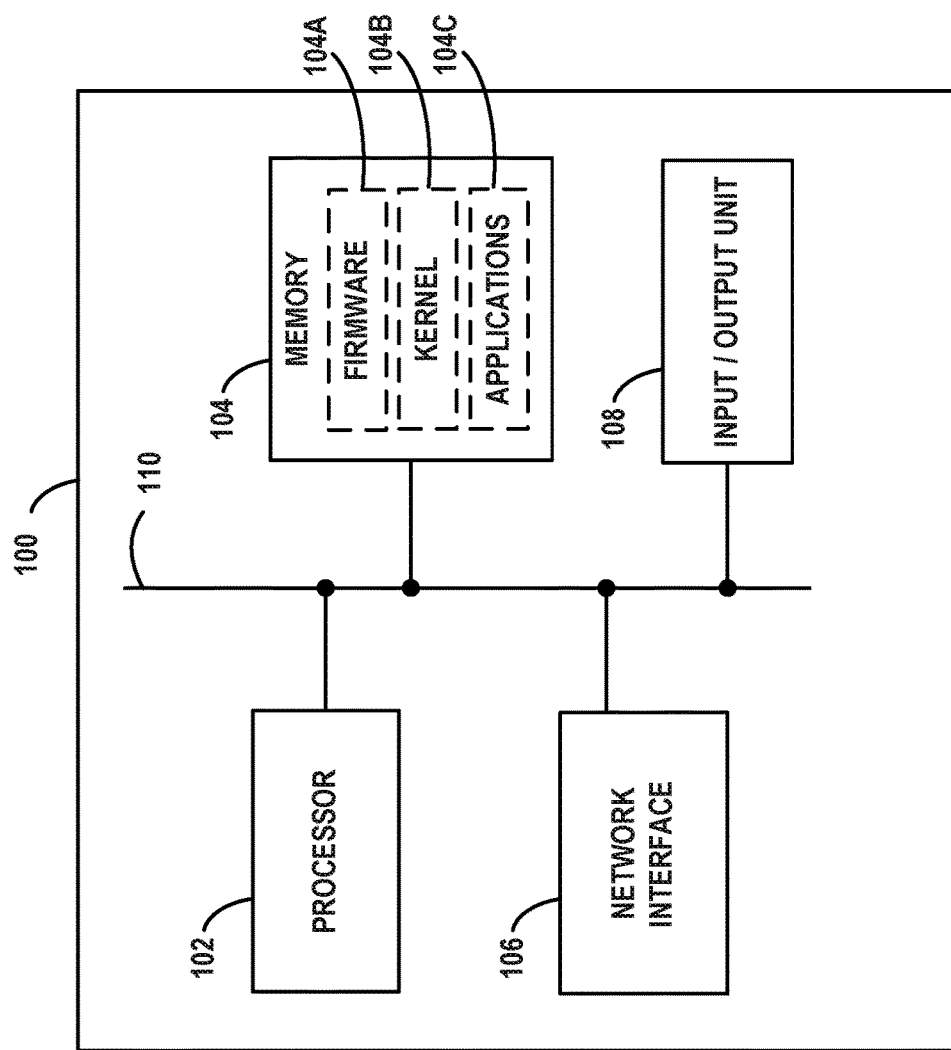
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
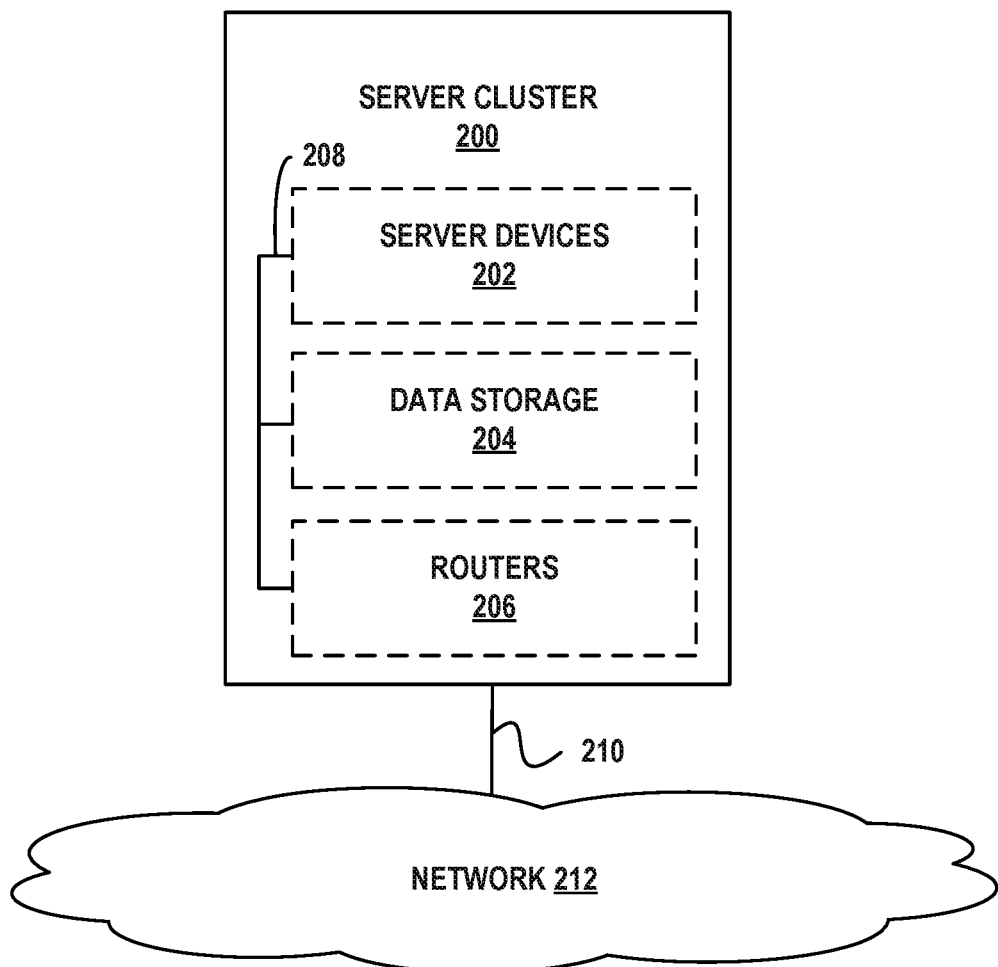
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
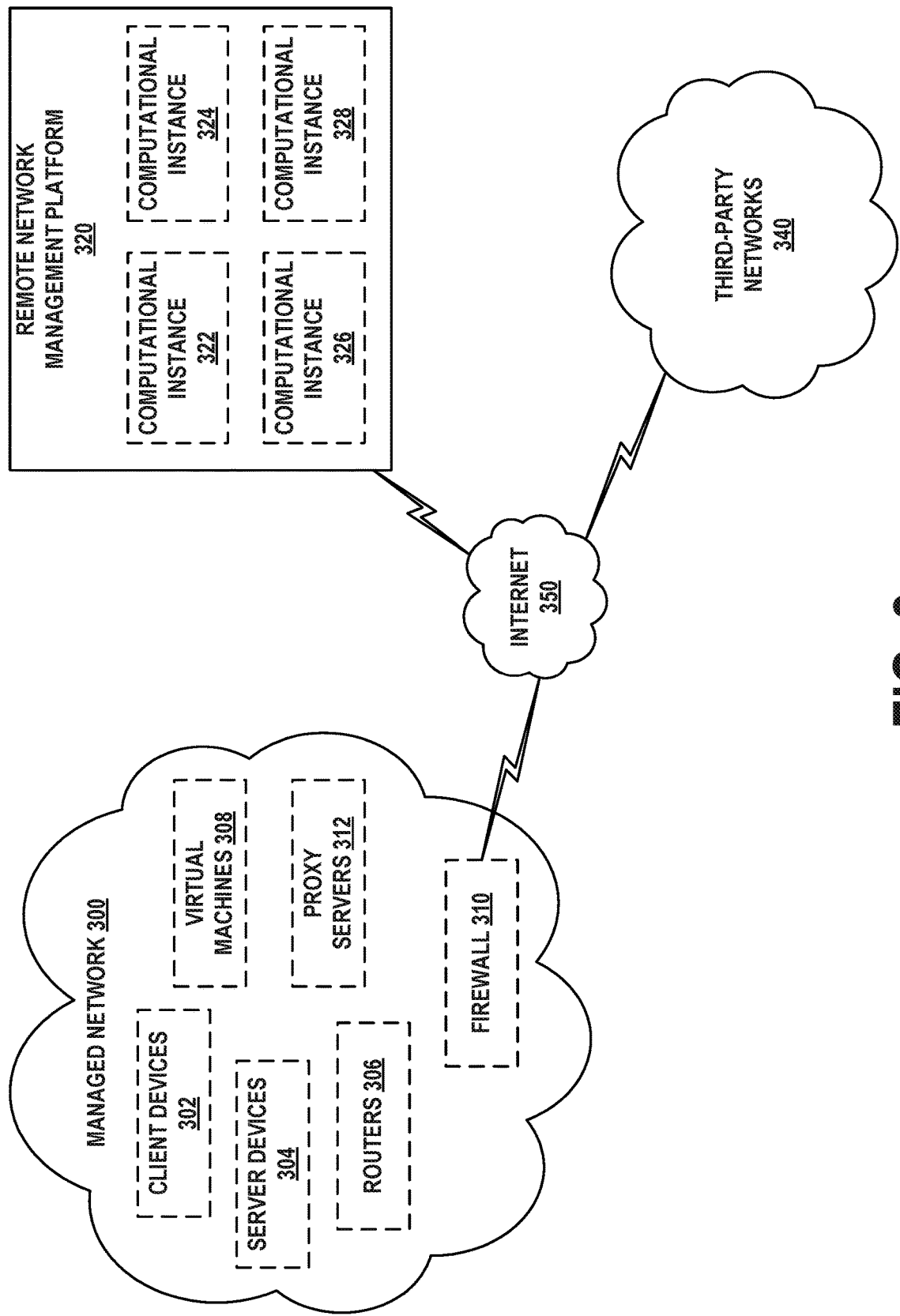
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
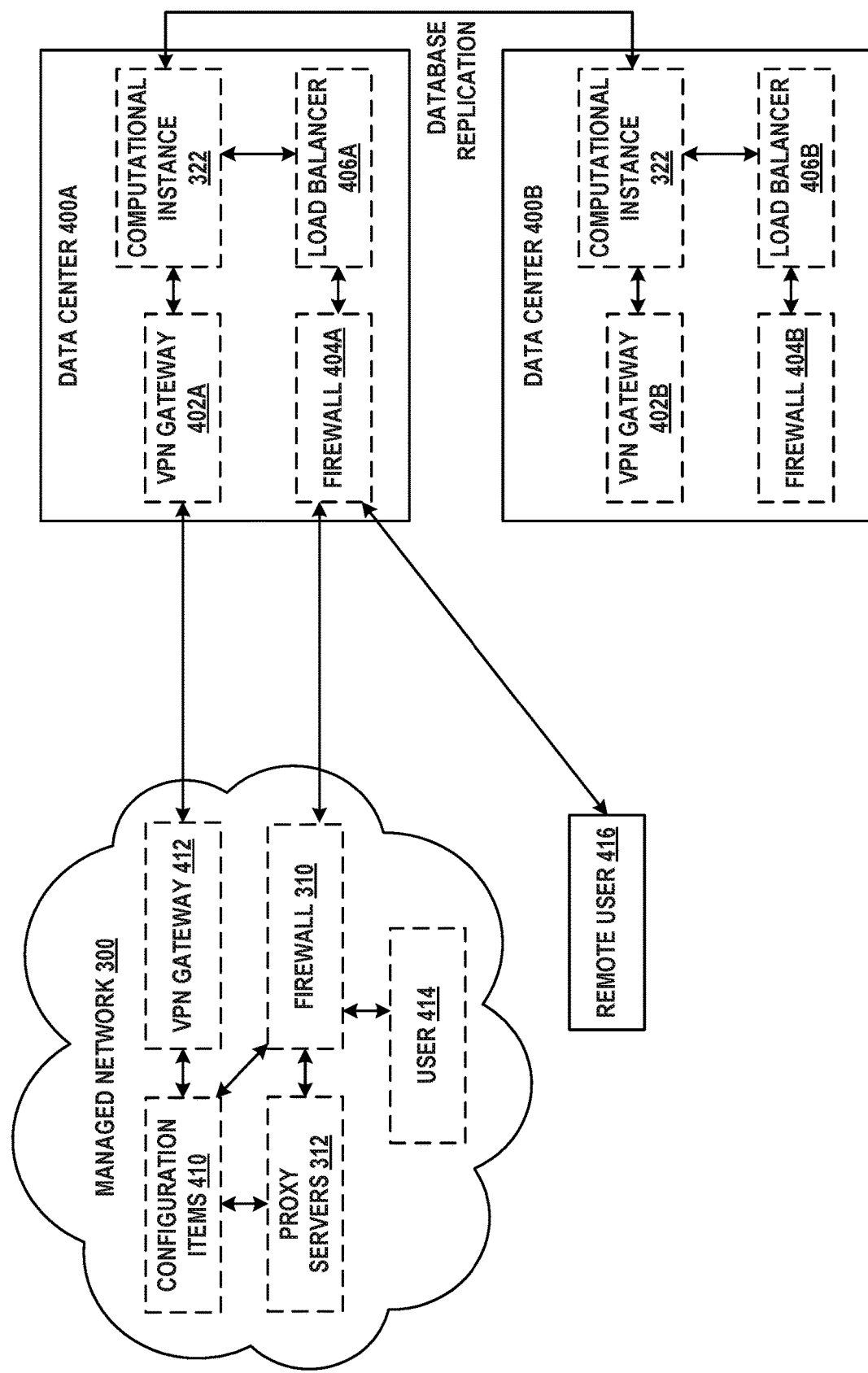
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
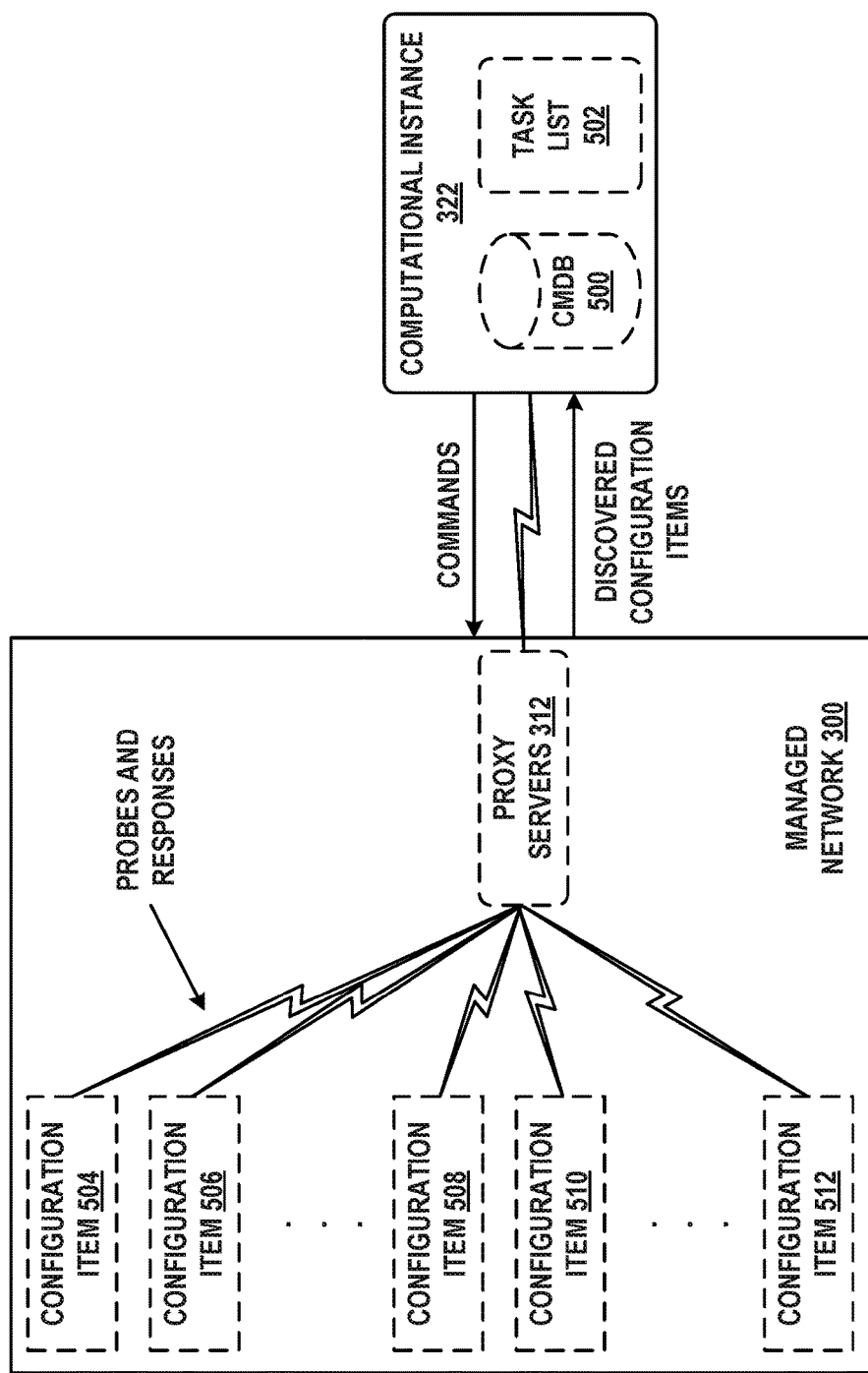
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
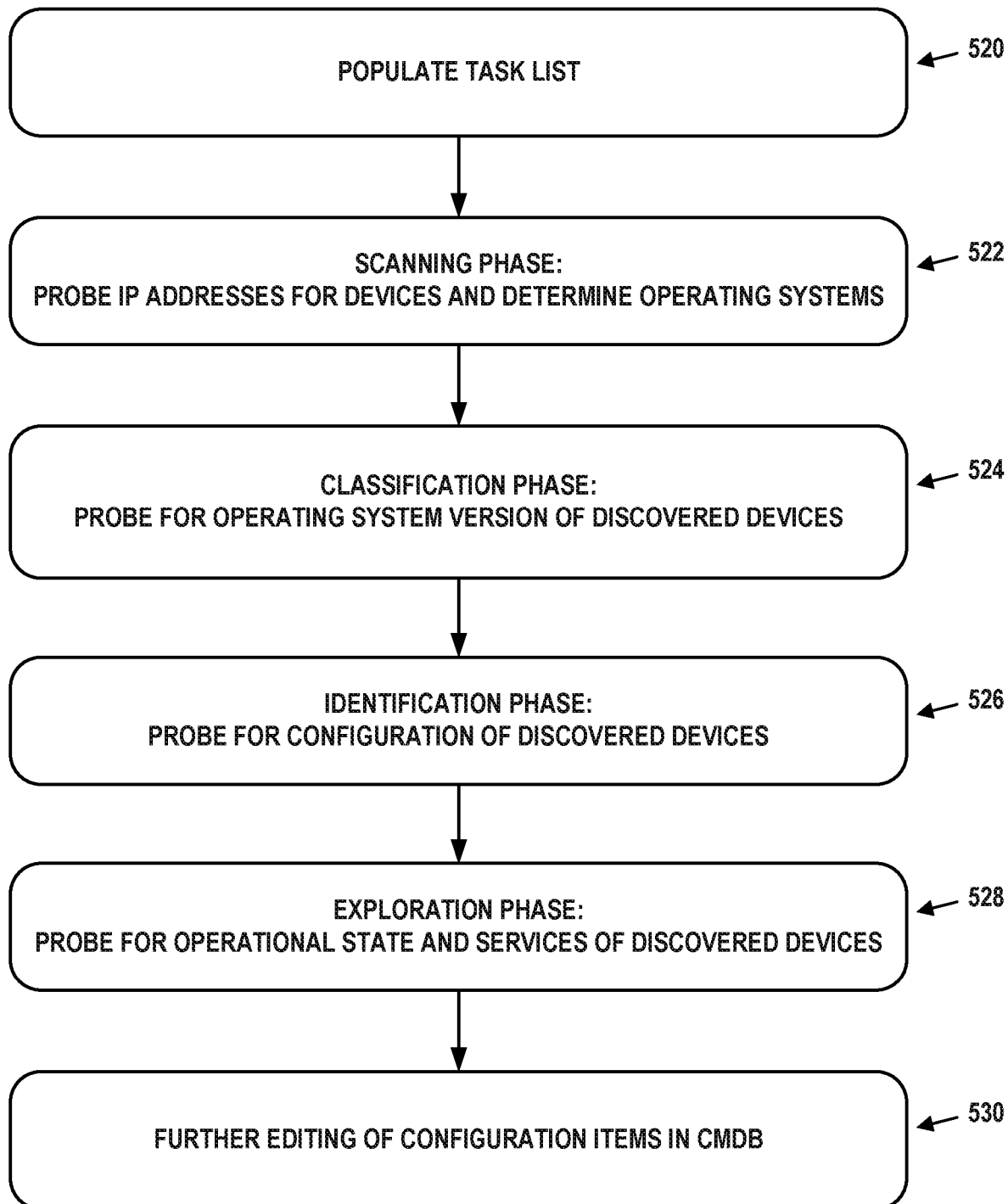
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE PERFORMANCE ANALYTICS VISUALIZATIONS

As described herein, a visualization may take various forms. Generally, visualizations typically involve the presentation of KPIs in a graphical format.

KPIs may also be referred to as metrics or indicators. In general, KPIs are a type of performance measurement used to evaluate current and past conditions, as well as to forecast trends. KPIs can be used to evaluate the success of a particular activity, such as making progress toward strategic goals or the repeated achievement of some level of operational goal (for example, zero defects, a mean time to resolution of less than 24 hours for certain types of IT issues, or less than 70% processor utilization on a particular server device).

The act of measuring a KPI may be referred to as collection. KPIs are associated with one or more KPI sources that define one or more fields in a database table (sometimes called a facts table) that are to be collected in order to provide the KPI data. KPI sources may also specify filters to include only a subset of the information in a field. KPI data—e.g., measured or collected data—may be stored, possibly with other KPI-related and PA-related data, in the database. The database for these data is referred to herein as a PA database.

A dashboard is single-screen GUI component that contains one or more tabs that logically group components that generally belong together. In some embodiments, a dashboard may be equivalent to or contained within a GUI window. Tabs may be graphical control elements that allow multiple documents or panels to be contained within a single dashboard. Tabs can be used to switch between such documents or panels. Individual GUI widgets may be present on such tabs. These widgets may display a KPI as a latest value, a time series, in a chart, in a speedometer, in a dial, in a scorecard, or in a column. Other variations are possible.

Breakdowns allow organization and filtering of KPI data on tabs and dashboards. In some embodiments, breakdowns may take the form of a drop down GUI widget. Regardless, the KPI data can be divided in various ways based on category. For instance, IT trouble ticket incidents can be divided by priority or by originating department. In some cases, breakdowns can use these multiple ways of dividing data in tandem, such as breaking down IT trouble ticket incidents first by priority, then by originating department.

A scorecard can be a dashboard, tab, or widget that displays data related to a single KPI (e.g., in a time series chart widget) and enables detailed analysis of this data. In some embodiments, each KPI may have an associated scorecard that is automatically created. The data may be viewed by breakdown and/or in aggregate (e.g., counts, sums, and maximums of the values). Scorecards may also provide ways of viewing the database fields on which the KPI values are based.

Any of these elements (dashboards, tabs, widgets, breakdowns, and scorecards) may be considered a visualization, or components thereof, and can be user customized. For instance, a user can rearrange the tabs of a dashboard, add or remove widgets from a tab, and create new breakdowns. The appearance of a dashboard, such as what tabs and/or widgets are included, what formats of visualization are included, data ranges, etc., may be determined by one or more configuration settings. In some example embodiments, configuration settings, or just "configuration" for short, may be defined by various data elements and entities, including data tables, data records, variables, parameters, and the like, which can be stored in memory and used to control the content and appearance of the visual, analytical, and interactive components that make up a dashboard. Setting and adjusting values of the data elements and entities allows the appearance and function the dashboard to be set up, as well as adjusted or tuned.

Figure 6A:
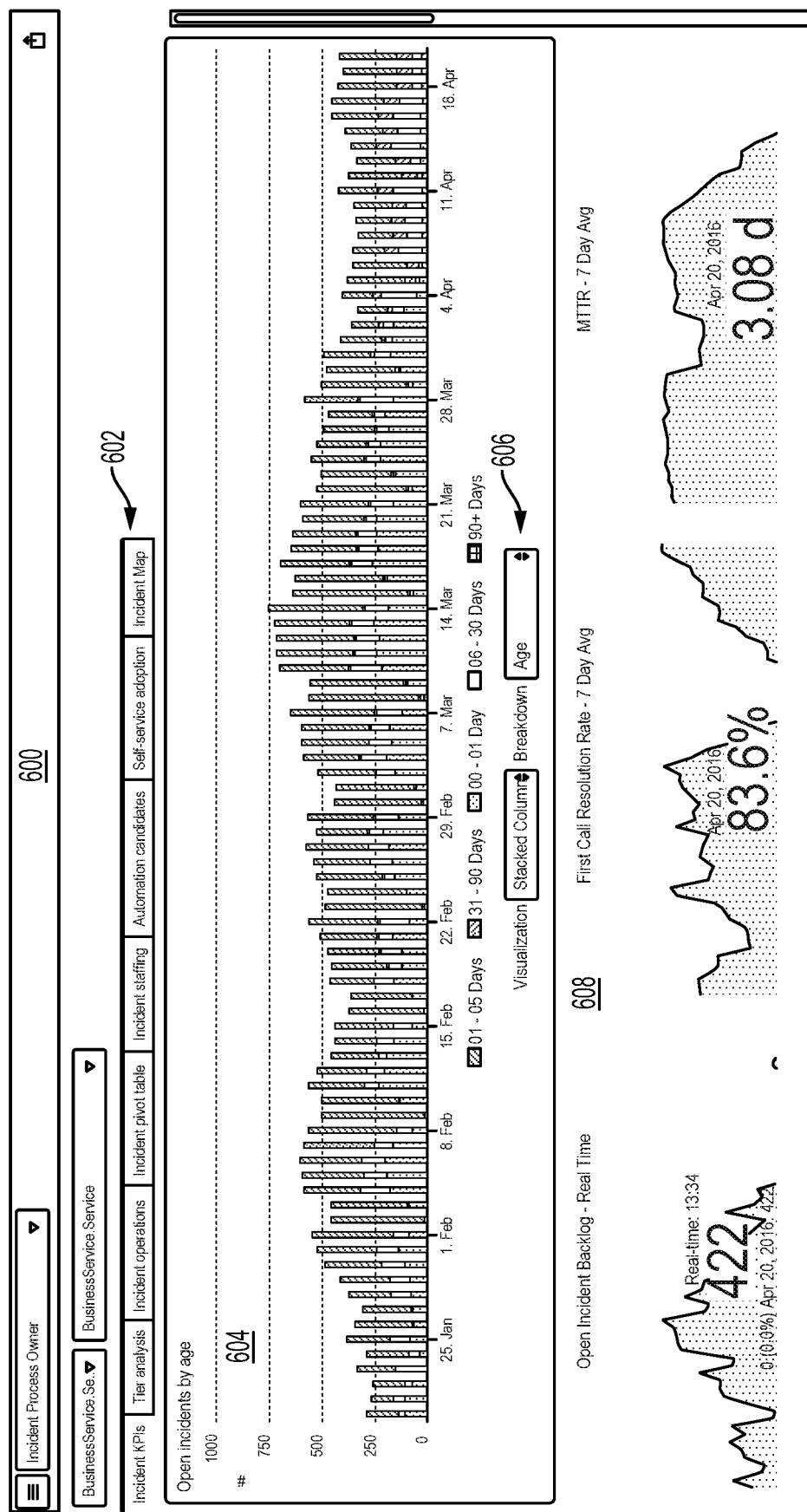
FIG. 6A depicts a performance analytics dashboard in the form of a graphical user interface, in accordance with example embodiments.
Figure 6B:
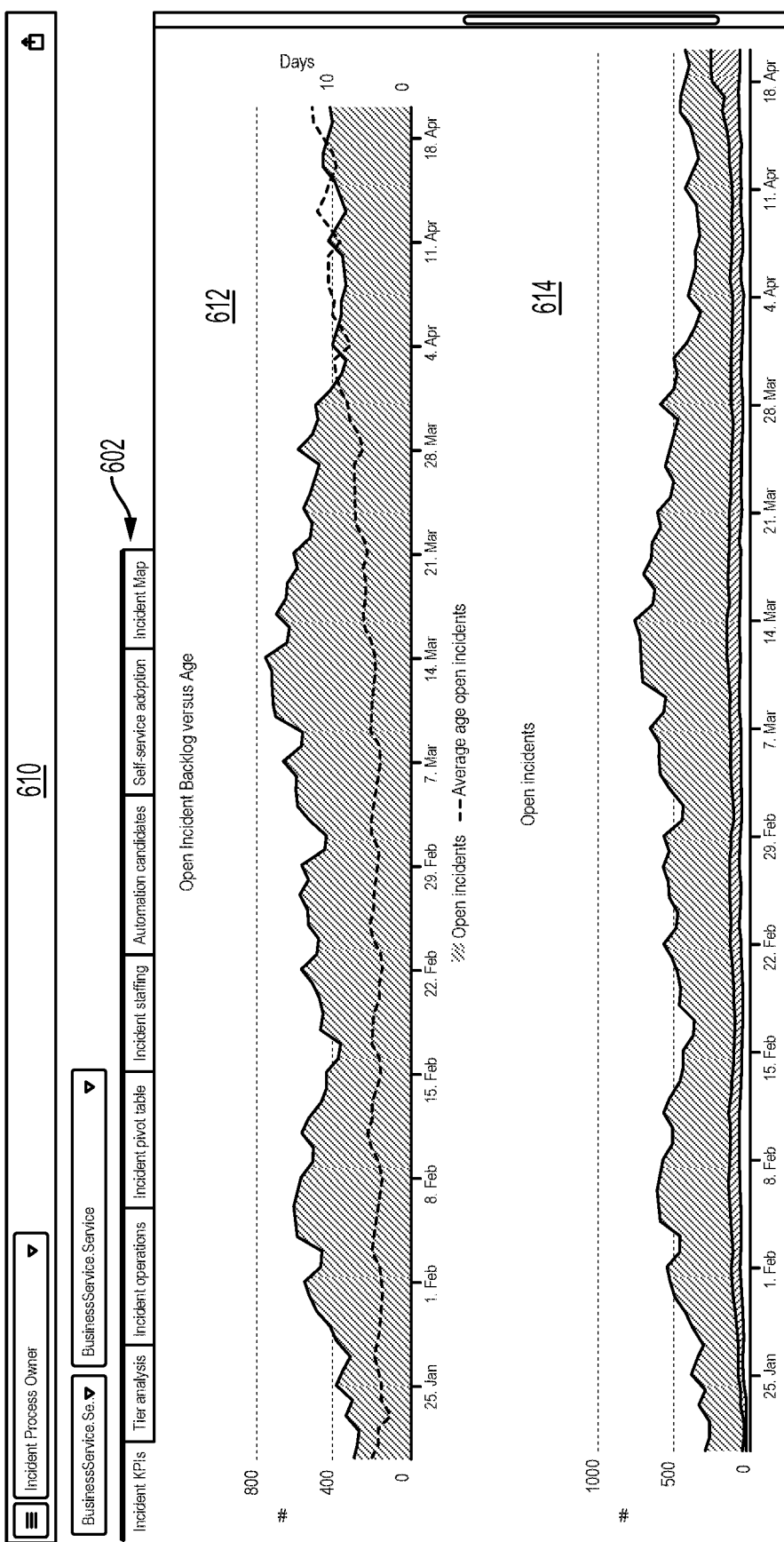
FIG. 6B depicts a performance analytics dashboard in the form of a graphical user interface, in accordance with example embodiments.

Example dashboards are shown in FIGS. 6A and 6B. Dashboard 600 of FIG. 6A includes multiple tabs 602, such as an "Incident KPIs" tab, a "Tier analysis" tab, and so on. The "Incident KPIs" tab is displayed, and includes a widget in the form of a bar chart 604, titled "Open incidents by age". Bar chart 604 plots, for each day of an approximately three-month time period, the total number of open incidents for the age ranges of 0-1 days, 1-5 days, 6-30 days, 31-90 days, and over 90 days. These age ranges may be defined by the "Age" category of breakdown 606.

These incidents may be, for example, trouble tickets or help requests opened with an IT organization. Each incident may therefore involve a particular problem that a user has experienced, such as a computer crashing, a user being unable to log on to a service, slow performance of a service, a request for new equipment, and so on. The IT organization may track its performance by measuring how long it takes to resolve the incidents. For example, bar chart 604 suggests that there were fewer open incidents near the end of the time frame than at the middle of the time frame, but that the incidents near the end of the time frame had remained open for a longer duration (i.e., there were more open incidents in the 31-90 days age range).

Dashboard 600 may also include section 608, which includes three widgets for: the extent of the open incident backlog (in this case, there are 422 open incidents currently), the first call resolution rate (in this case, 83.6%), and a seven-day running average of the mean time for an incident to be resolved (in this case, 3.08 days). This latter KPI may also be referred to mean time to resolution, or MTTR.

Dashboard 610 of FIG. 6B shows different example visualizations related to open incidents. This dashboard contains the same tabs 602, but includes charts 612 and 614 instead of bar chart 604 and section 608. Chart 612 plots, for the same time frame of the visualization in FIG. 6A, open incidents against the average age of these open incidents on a dual y-axis graph. Chart 614 also plots open incidents, but includes representations of the age distribution of these incidents.

Dashboards 600 and 610 also include various selectors, such as breakdowns in the form of drop down menus that allow the user to view these KPIs in different ways. Regardless of their exact mechanisms, these dashboards allow the user to rapidly determine the status of the organization's incident response KPIs through the use of visualizations that combine these KPIs.

The data displayed in bar chart 604, section 608, chart 610, and chart 612 may be visualizations defined by a data model. Thus, information defining these visualizations may be stored in a database according to that data model. The information may also be identified as representing one or more KPIs, and each KPI may be represented as one or more tables in the data model. As demonstrated in FIGS. 6A and 6B, multiple visualizations may use the same KPIs to provide different views of the represented data.

VI. EXAMPLE PERFORMANCE ANALYTICS SYSTEM AND OPERATION

In some example embodiments, a managed network 300 may support the mission and operations of an enterprise or other organization, while the infrastructure that supports the management functions, operations, and tasks, including remote management, are provided by a third party, such as a network management service provider. With such an arrangement, a computational instance, such as computational instance 322 may be operated (and possibly owned) by the third party service provider, and the management services provided on a fee or subscription basis to the enterprise, which may be considered a customer or subscriber. Among the management services provided by the service provider, then, may be performance analytics. The service provider may thus be interested in how performance analytics is packaged, not just from a functional or operational point of view, but as a paid service as well.

In accordance with example embodiments, performance analytics may be implemented as a PA application program within or as part of a computational instance 322. More particularly, the PA application may be provided to customers or subscribers as a tiered offering. For example, the PA application may include default or base functionality with respect to one or a few default or base KPIs, available as a base-level tier, and may further provide for program extensions for additional KPIs, available as one or more higher-level tiers. In an example deployment, the base-level tier may be provided with a base subscription, while additional KPIs and/or tier levels may be provided at additional cost or other compensation structure. Other arrangements are possible as well.

There can be other reasons besides subscription and/or tiered pricing to implement performance analytics as a base PA application for base KPIs, with extensible functionality for additional KPIs. For example, the potential number of KPIs for a managed network can be quite large, numbering in the 100s to 1,000s. However, a customer or subscriber may only be interested in a subset of all available KPIs at any given time. Similarly, the subset of KPIs of interest may vary from time to time. However, the computing and storage resources needed for concurrent installation of all the PA extensions may not necessarily be insignificant. As such, selective use of PA extensions, rather than wholesale installation of most or all available PA extensions, may provide benefits for operational efficiency of the overall PA application.

In a typical customer/subscriber usage scenario, there may be various personnel of the customer organization that want to extend the PA application to additional KPIs from time to time, not all (or any) of whom may have administrative privileges (or the like) for making programmatic adjustments or changes to the network management system. Accordingly, example embodiments provide for the ability for authorized personnel (e.g., customer end-users) who normally lack administrative (or similar) privileges to make KPI extensions to the PA application.

In addition, the potentially large number of available KPI extensions, as noted above, may make discovery by end-users of KPIs relevant to particular analysis tasks, or of interest to personnel carrying out the tasks, difficult or inefficient. Accordingly, example embodiments further provide for an interactive mechanism for organizing and presenting KPI extensions in an interactive format that aids customers' discovery, selection, and installation of KPI extensions.

As illustrated above by way of example, making PA visualization functional for a given KPI involves configuring a dashboard for the given KPI. This applies for the base PA application as well as extension. Thus, example embodiments also provide for a streamlined configuration process of KPI extensions selected by a customer. This allows non-expert users to install KPI extension, further removing potential barriers that might otherwise arise from the large number of available KPI extensions coupled with at least one common type of user (e.g., non-experts).

In addition to addressing challenges that end-user customers might face in navigating and configuring available KPI extensions to a base/default PA application program, example embodiments also help facilitate robust procedures for the service provider to roll out system updates, as well as help ensure the stability of the customer's configured KPI extensions when updates are rolled out.

In accordance with example embodiments, an extensible PA application program may be implemented with an architecture that draws on a plugin model for configuration of KPI extensions, while adapting the plugin model to address the operational environment in which the performance analytics may be used. In an example embodiment, the components and elements of an extensible PA application program may include a base or default PA application program; one or more KPI modules, each being a programmatic KPI extension and each including KPI module content; one or more content packages or content plugins for installing corresponding KPI module content and configuring KPI modules; and an unlocking plugin for activating or unlocking available KPI modules. Each of these components and elements is discussed further below.

A. Example Plugin Architecture

Figure 7:
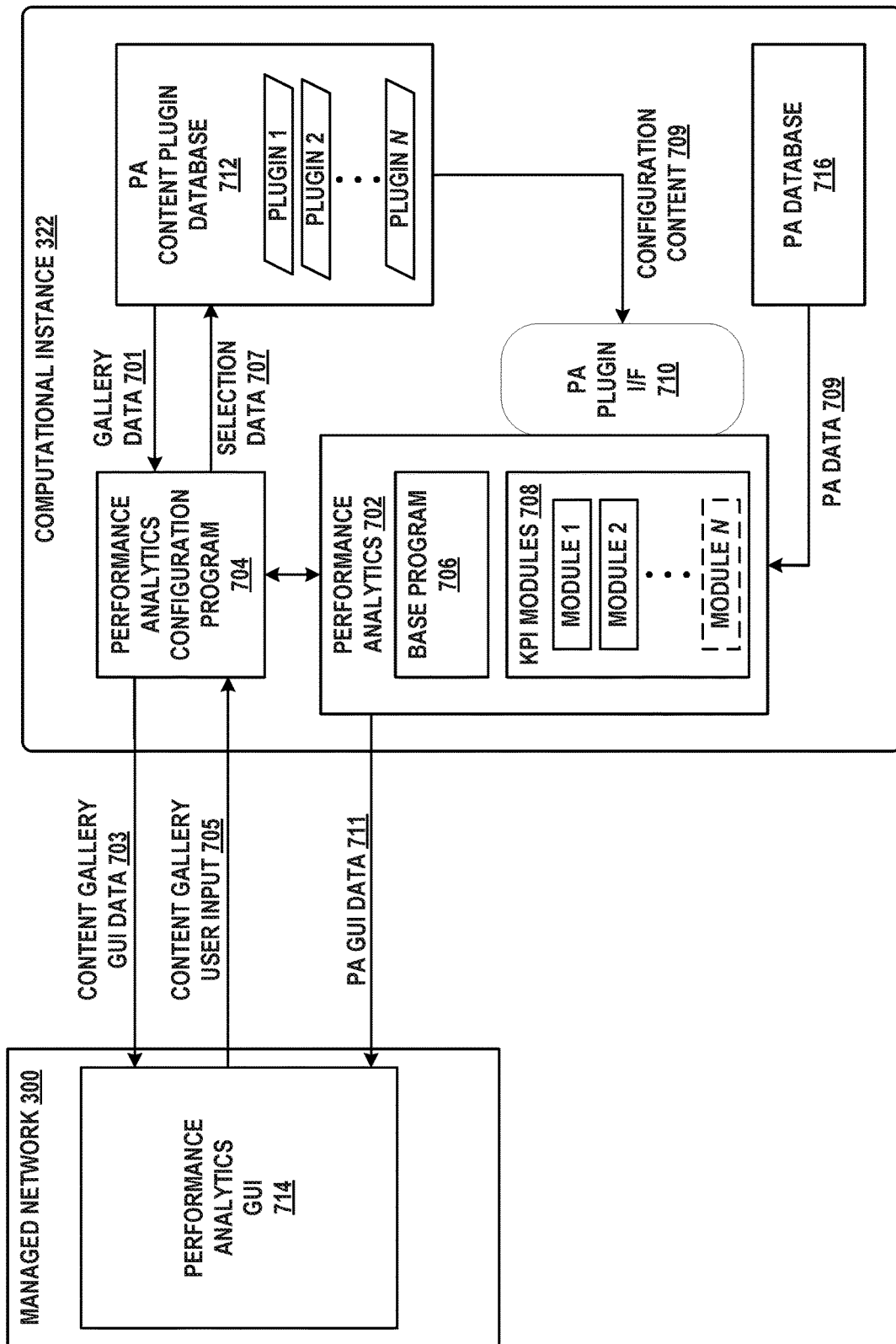
FIG. 7 depicts a performance analytics configuration system architecture, in accordance with example embodiments.

FIG. 7 depicts an example architecture that uses content plugins to configure KPI modules. As shown, the example architecture may be implemented in a computational instance 322 of a remote network management platform, such as that illustrated in FIG. 3. The computational instance in FIG. 7 may represent hardware and programmatic (e.g., software, firmware, etc.) elements and components used to support remote network management of a managed network 300, such as that shown in FIG. 3 and also shown in FIG. 7. The managed network 300 may include a PA graphical user interface (GUI) 714, as shown, through which a user may engage in various PA tasks and operations. The PA GUI 714 could, among other functions, display dashboards, such as those illustrated in FIGS. 6A and 6B. In the context of PA configuration, the PA GUI 714 could also serve as an interactive interface through which a user may engage in PA configuration tasks and operations of the example systems and methods described herein. Various elements and components of the computational instance 322 and managed network 330 shown in FIG. 3 are omitted from FIG. 7 for the sake of brevity. Their omission in FIG. 7 should not be construed to necessarily imply an actual absence of these components and elements in the illustrated example.

In accordance with example embodiments, the computational instance 322 may include a PA application program 702, a PA configuration program 704, a PA content plugin database 712, a PA plugin interface (I/F) 710, and a PA database 716. The PA application program 702 may include a base program 706 and one or more KPI modules 708, which are labeled "Module 1," "Module 2," . . . , "Module N" in the illustrated example. As described above, the base program may provide default PA functionality for a default one or more base KPIs, while the KPI modules support extending PA functionality to one or more additional KPI. At a given time, one or more of the KPI modules may be in a locked state or an unlocked state. A locked KPI module may be one that is part of a customer's subscription but is not yet installed (e.g., in program memory) and does not use any computing resources. When unlocked, a KPI module becomes executable, and may account for and/or consume computing resources (e.g., program memory, processing cycles, etc.). By way of example, Module 1 and Module 2 are taken to be in an unlocked state, while Module N is taken to be in a locked state. The dashed line of Module N is used as visual cue in the figure to represent a locked state.

The PA content plugin database 712 may take the form of a non-transient storage medium, such as disk or memory, and include one or more content plugins, labeled "Plugin 1," "Plugin 2," . . . , "Plugin N," each corresponding to a respective one of the KPI modules 708. In the illustrated example, Plugin 1 contains content data for configuring Module 1; Plugin 2 contains content data for configuring Module 2; Plugin N contains content data for configuring Module N, and so on. By leveraging known aspects of plugin models for adding and/or extending functionality of application programs installed in a computing device, content plugins may serve as programmatic vessels of configuration data for KPI modules. In example embodiments, the PA plugin I/F 710 may be configured to provide a predictable and uniform interface for installing content data from content plugins into KPI modules. The PA I/F 710 may be implemented as programmatic instructions (e.g., software, firmware, etc.) and/or one or more hardware components or elements (e.g., a device or customized processor). Unlike conventional plugins, which typically include program instructions as well as data, content plugins may include only content data used for KPI module configuration.

The PA database 716 may provide storage and database operations (e.g., read/write, selection, retrieval, etc.) for PA data, including KPI measurements, for example. The particular KPIs that are monitored and measured may depend on which KPIs are included in the base program 706 and activated (unlocked) KPI modules, and on how the base program and activated KPI modules are configured.

In example operation, the various components and elements identified above may communicate with each other and/or exchange different types of data and information. More particularly, in PA operation applied to a particular KPI, measurement and/or other data related to the particular KPI may be transferred as PA data 709 from the PA database 716 to the PA application program 702. Upon processing and/or analysis, corresponding PA GUI data 711 may be transmitted to the PA GUI 714 for display and further analysis or manipulation by a user working at the PA GUI 714. This is just one example of data flow in PA operation.

In another example of operation, a user at the PA GUI 714 may wish to view available KPIs—e.g., those which are part of the user's subscription (or the subscription of an organization/customer at which the user works)—that may not yet be installed and/or configured. In accordance with example embodiments, the PA GUI 714, with data and services of the PA configuration program 704, may present an interactive graphical gallery of content plugins that the user may peruse. In doing so, the PA configuration program 704 may retrieve gallery data 701 from the PA content plugin database 712, and provide corresponding content gallery GUI data 703 to the PA GUI 714, as indicated. The user may then interact with the display content gallery, for example by selecting a KPI module to configure. This could be one example of content gallery user input 705 provided by the PA GUI 714 to the PA configuration program 704. Upon processing the received content gallery user input 705, the PA configuration program could send selection data 707 to the PA content database 712, which could in turn provider a selected content plugin as configuration content 709 to the PA plugin I/F, as indicated. As described above, installation of the content plugin could then configure a corresponding KPI module 708, making it ready for use by the user.

Although not explicitly shown in FIG. 7, before configuring a particular selected KPI module, a user may first unlock the selected KPI module using an unlocking plugin. In an example embodiment, a single, common unlocking plugin may be used to unlock any previously locked KPI module, as long as it is part of the customer's subscription, or made available by some similar arrangement. Once a user unlocks a selected KPI module, the user may then install the content plugin associated with the unlocked KPI module.

In a conventional plugin model, in which plugins may include program code as well as data, there can be inter-plugin dependencies, such that installation of one particular plugin may require that one or more other plugins be installed as well. For example the one particular plugin may rely on functionality provided in one of the other plugins. Resolving such dependencies can thus involve a cascade of program code installation, some of which may require installation in a privileged mode of the host operating system. As a result, some conventional plugin installations may fail if the user invoking them does not have sufficient privileges—e.g., administrator privileges—to install all the program elements needed to resolve the dependencies.

In the context of content plugins for KPI module configuration, a typical user who may be interested in configuring and using KPI modules may lack the sort of privileges required for conventional plugin installation. Further, although content plugins may not include program instructions or code, there may still be data interdependencies between different content plugins, some of which may require administrator privileges (or a similar level of system privileges) in order to resolve. In anticipation of this scenario, example embodiments herein account for potential interdependencies by ensuring all such interdependencies among content plugins available in the system are prior to deploying the system. More specifically, all available KPI modules—for example, all those included in a particular subscription—are known when a system is deployed, or when a system may subsequently be updated. Thus, it is possible to identify all possible interdependencies among the content plugins of the subscription, and therefore they may all be resolved before any given user associated with the subscription attempts to install a plugin and configure a corresponding KPI module. As a further advantage, including resolution of interdependencies may incur little if any additional system resources, such as memory and processing cycles.

In accordance with example embodiments, a plugin model for KPI module configuration may facilitate robust reliability and accuracy testing of updates to KPI modules and content data used for configuration. More particularly, because content plugins may cleanly compartmentalize configuration data, when the data for a particular plugin is updated and/or the associate KPI module is updated, testing of the update(s) prior to live deployment may proceed in isolation from other plugins and KPI modules. This mode of testing therefore insulates the overall PA application and other KPI modules from disruptions and/or corruption as potential problems and/or errors in individual updates may be discovered and corrected. The result is enhanced efficiency of the process of developing and deploying updates to the PA system.

In further accordance with example embodiments, and related to deployment of PA system updates, the plugin model for KPI module configuration may also maintain stability of individual customers' existing, configured KPI modules. More specifically, a given customer may invest time, effort, and deliberation in the configurations of their active (unlocked) KPI modules. It may therefore be in the interest of the vendor or service provider, as well as the customer, to avoid unintended reconfigurations when updates to content plugins are deployed. Content plugins may introduce a degree of predictability into this process, such that changes to plugin content in an updated plugin can be screened for possible disruptive modifications to a customer's existing configurations controlled by the plugin. Such modifications may be identified during the update process, and the corresponding customer configurations left intact by foregoing installation of the offending updates. Note that in some instances, an updated plugin may include new tables, records, variables, or the like, that may be introduced during update rollout, without disturbing existing configuration data. Thus, content plugins may still accommodate partial updates while leaving existing configurations untouched.

B. Example Content

The dashboards illustrated in FIGS. 6A and 6B include graphical representations of KPI data, as well as various GUI features for control and formatting of the data, launching functions and operations, selection of data and data ranges, and selection of tabs, to name a few. These and other aspects of dashboard appearance and function are determined according to both the programmatic construction of the dashboard, as coded instructions of a KPI module, for example, and configuration of the dashboard, as specified in the associated content plugin. For example, the tabs 602 in the dashboard of FIG. 6A may be specified in a data table that lists individual tabs to include and where to place them in the graphical representation of the dashboard. Similarly, the placement and format of the bar chart 604 may be specified according to a data record associated with the KPI data, and including fields for defining appearance and formatting of the data. As another example, the section 608 of the dashboard includes three widgets for displaying various characteristics of the KPI data. The inclusion and placement of these widgets may also be determined according to a table of widgets in a configuration file. It will be appreciated that these are just a few examples of dashboard content and format that may be specified by a content plugin associated with the KPI module. The dashboard shown in FIG. 6B illustrates further examples.

In accordance with example embodiments, the richness of dashboard functionality, together with the array of options for formatting and display of dashboard controls and KPI data, may be supported, in part, by an adjustable and/or customizable configuration provided in content plugins. As noted, the configuration content data in a plugin may include tables, records, variables, and parameters, among other data specifications. In order to streamline configuration of KPI modules and make it convenient and efficient for users to install and prepare KPI modules for use in the PA application environment, content plugins may be provided with default configurations in place. By doing so, a user may start using a newly-installed KPI module simply unlocking it with the unlocking plugin and configuring it by little more than a click-to-install action on the PA GUI 714, for example.

Installation of the plugin then commences by transferring configuration data specified in the selected content plugin into associate data definitions, structures, and the like, in the corresponding KPI module. Note that experienced or expert users may still customize configurations beyond or differently from the default provided in the content plugin. Non-limiting examples of customizing configurations may include changing query definitions for indicators or breakdowns used in PA of a KPI, and/or changing permissions of dashboards to allow more or fewer (or specific) users the ability to view and/or edit particular dashboards. But these types of configuration may also be set by default in content plugins, so that expertise in configuring KPI modules is not necessary for installing and configuring them.

C. Example Content Gallery

As discussed above, the PA application program 702 may support monitoring and analysis of a large number of KPIs. Architecturally dividing this support between a base program 706 and multiple KPI modules 708 provides various advantages and benefits, also discussed above. The PA configuration program 704 supports operations and functions by which a user may install and configure KPI modules as extensions to the base program.

In accordance with example embodiments, the PA configuration program 704 may further operate to generate a graphical presentation of the multiple KPI modules available to a customer in the form of an organized gallery of content plugins. By interacting with the PA configuration program 704 through content gallery, a user may peruse and navigate the multiple KPI modules that may be available, for example as part of a customer subscription. In example use, gallery organization may help a user search and find one or more KPI modules that address a KPI monitoring/analysis need of the user. In addition, the gallery organization may introduce the user to KPI modules and PA capabilities that the user might not necessarily otherwise become aware of. From the point of view of a system vendor or service provider, the ability to "educate" users about PA capabilities and specific KPI modules may provide incentive for the users/customers to utilize PA even more, and possibly to consider adding KPI modules to their existing subscriptions.

Figure 8A:
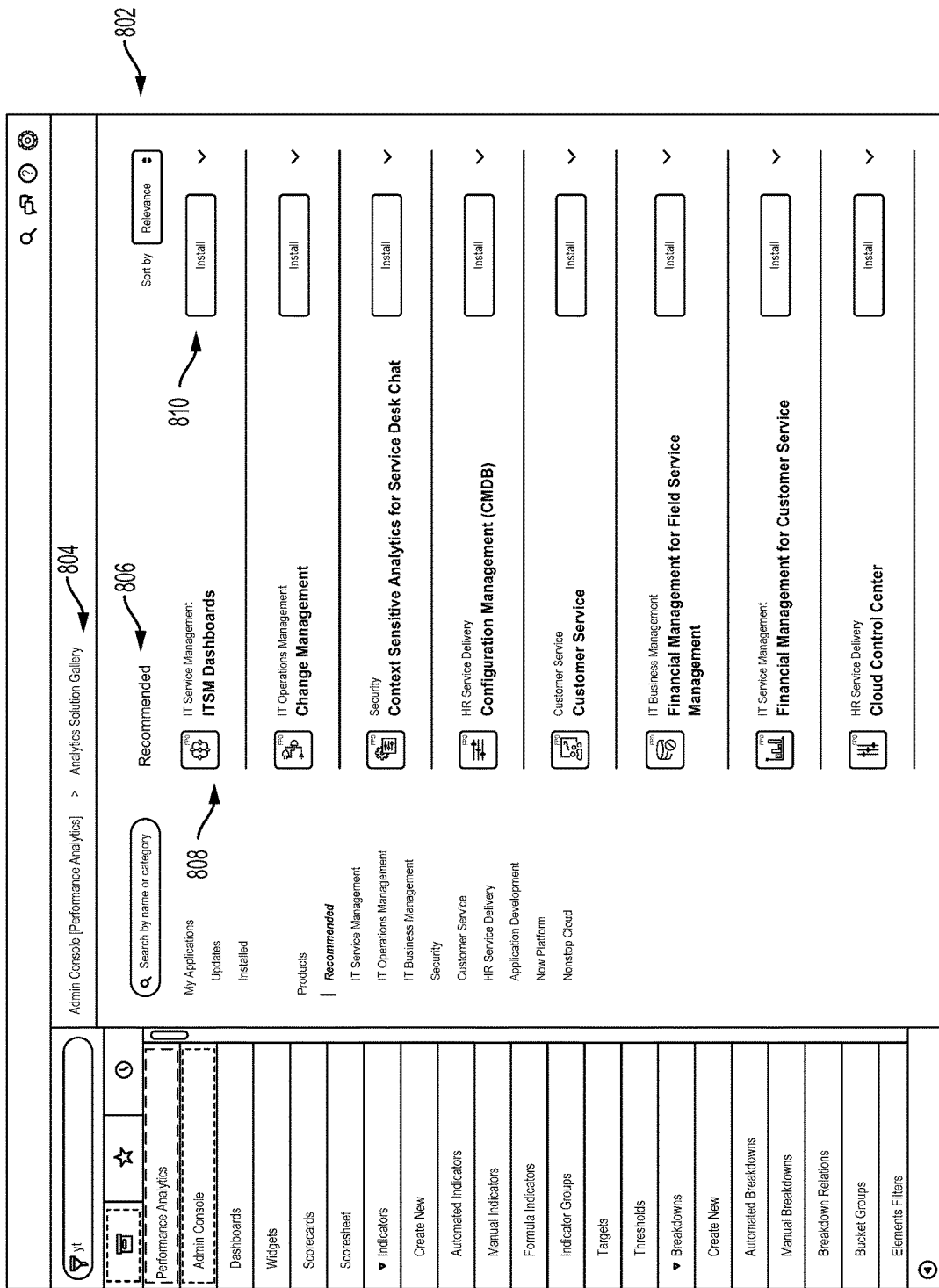
FIG. 8A depicts performance analytics configuration system content gallery in the form of a graphical user interface, in accordance with example embodiments.

FIG. 8A is an example illustration of a graphical content gallery 802, such as might be displayed in the PA GUI 714. By way of example, the content gallery is categorized as Analytics Solution Gallery 804, and is further sub-categorized as Recommended 806. It will be appreciated that these categories and sub-category are just examples of possible organizational components of the illustrated content gallery 802. As shown, a number of content plugins are displayed in a list form, starting with an ITSM Dashboards plugin 808 at the top. Again this organization is just one possible example. Also by way of example, the ITSM Dashboards plugin 808 has an identifying icon to the left and an Install button 810 on the right. Specific labeling of other icons and features of the display shown in FIG. 8A are omitted for brevity.

Figure 8B:
FIG. 8B depicts performance analytics configuration system content gallery plugin detail expansion in the form of a graphical user interface, in accordance with example embodiments.

In an example embodiment, additional information about a plugin may be obtained by one or another interactive navigation-like action. For example, a cursor-click on the identifying icon of a plugin may open an additional display containing descriptive details about the plugin and the associated KPI module that becomes operational by configuring it. FIG. 8B is an example illustration of an additional display 812 that could include descriptive details 814 for the ITSM Dashboards plugin 808. By way of example, the descriptive details 814 includes a short narrative description followed by identification of three dashboards that are part of the ITSM Dashboards 808 and sample illustrations of the three dashboards. The install button 810 is also part of the expanded graphical description of the ITSM Dashboards plugin 808.

By clicking on the install icon 810, a user could cause the PA configuration program 704 to send selection data 707 to the PA content plugin database 712, causing the selected plugin to be retrieved and installed in the appropriate module of the KPI modules 708. By doing so, the user could begin to use the ITSM Dashboards 808, or any other KPI module selected through the content gallery 802. Thus, the content gallery makes it convenient to both explore available content plugins and to install them.

VII. EXAMPLE METHOD

Figure 9:
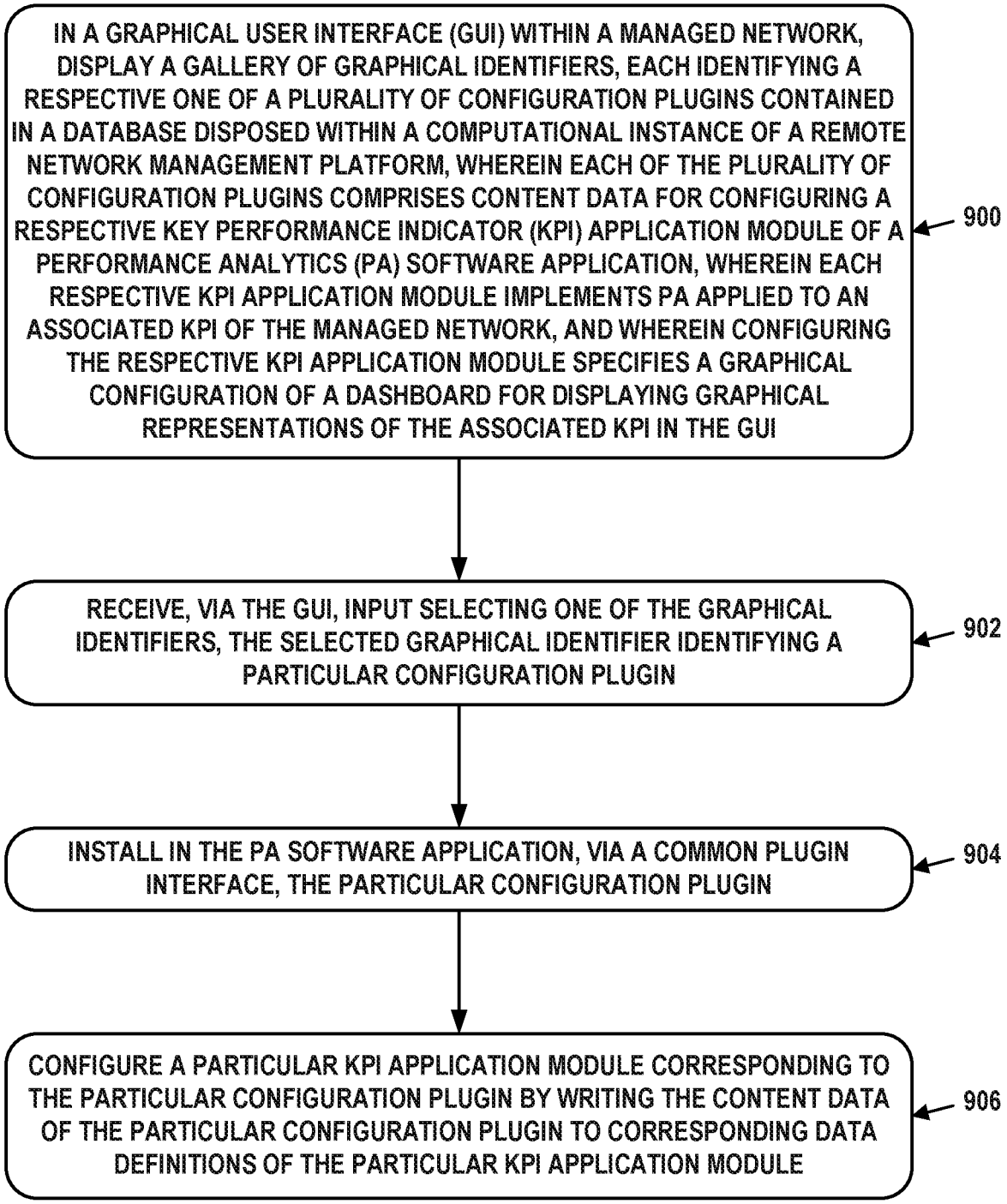
FIG. 9 is a flow chart, in accordance with example embodiments.

FIG. 9 is a flow chart illustrating an example embodiment of a method for configuring a performance analytics (PA) software application. The method illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device. In an example embodiment, the method illustrated in FIG. 9 may be carried out by a computing device disposed within a computational instance, such as instance 322, of a remote network management platform, such as platform 320, that remotely manages a managed network, such as network 300. Further, the computing device may be operational to execute a PA software application.

The embodiments of FIG. 9 may be simplified by the removal of any one or more of the features shown therein. Further, these embodiments may be combined with features, aspects, and/or implementations of any of the previous figures or otherwise described herein.

Block 900 may involve displaying a gallery of graphical identifiers in a graphical user interface (GUI) within the managed network. Each of the of graphical identifiers may identify a respective one of a plurality of configuration plugins contained in a database disposed within the computational instance of the remote network management platform. Further, each of the plurality of configuration plugins may include content data for configuring a respective key performance indicator (KPI) application module of the PA software application, and each respective KPI application module may implement performance analytics applied to an associated KPI of the managed network. In this arrangement, configuring the respective KPI application module specifies a graphical configuration of a dashboard for displaying graphical representations of the associated KPI in the GUI. In example embodiments, a configuration plugin may be a content plugin, as described above. Also, the term KPI application module is interchangeable with just KPI module.

Block 902 may involve receiving input selecting one of the graphical identifiers. In particular, the selected graphical identifier identifies a particular configuration plugin, and the input may be received via the GUI.

Block 904 may involve installing the particular configuration plugin in the PA software application. In particular, the installation may be made via a common plugin interface.

Finally, block 904 may involve configuring a particular KPI application module corresponding to the particular configuration plugin by writing the content data of the particular configuration plugin to corresponding data definitions of the particular KPI application module.

In some embodiments, displaying the gallery of graphical identifiers may entail displaying each of the graphical identifiers with accompanying information descriptive both of an identified configuration plugin and of a KPI and KPI application module corresponding to the identified configuration plugin. The accompanying information may include a text description of the corresponding KPI and KPI application module, a graphical representation of the corresponding KPI and KPI application module, or both.

In some embodiments, the example method may further entail identifying the particular KPI application module based on the particular configuration plugin prior to installing the particular configuration plugin, and determining if the particular KPI application module is an authorized extension of the PA software application for the computational instance of the remote network management platform. For example, authorized extension may be those included as part of a customer's subscription.

In some embodiments, the example method may further entail determining which configuration plugins of the plurality correspond to KPI application modules that are authorized extensions of the PA software application for the computational instance of the remote network management platform, prior to displaying the gallery of graphical identifiers, and then including in the gallery only graphical identifiers associated with the authorized extensions. For example, the gallery may only display graphical identifiers for content plugins corresponding to KPI modules that are part of a customer's subscription, and omit those that aren't.

In further accordance with example embodiments, data dependencies among those configuration plugins of the plurality are resolved prior to installation of any one of those configuration plugins. In an example, data dependencies may be resolved for content plugins that correspond to KPI modules that are authorized extensions of the PA software application. In this case installing the particular configuration plugin may entail discovering at least one of the resolved dependencies.

In further accordance with example embodiments, one or more KPI application modules that are authorized extensions of the PA software application may be in a locked state that prevents their corresponding configuration plugins from being installed. In this case, the example method may further entail providing a software key for unlocking locked KPI application modules. More particularly unlocking a locked KPI application module may then enable its corresponding configuration plugin to be installed. The example method may then also entail receiving, via the GUI, an input applying the software key to at least one of the one or more locked KPI application modules.

In some embodiments, the computational instance of the remote network management platform that remotely manages a managed network may implement different tiers of security access. For example, there may be a first security tier of security access for administrative users and a second security tier of access for non-administrative users, where the first security tier requires a higher level of access privileges than the second security tier. In accordance with example embodiments, and the second tier of security access may be sufficient for installing the particular configuration plugin. That is, non-administrative users may install content plugins.

In some embodiments, the content data may include one or more data tables, where each entries in each table have predetermined values; and one or more data records, where each with where fields in each record have predetermined values. The example method may then further entail updating the content data of one or more configuration plugins in the database with updated content data. In particular, for each of the one or more configuration plugins, the updated content data may include respective revised data. In an example, the respective revised data may be updated predetermined table-entry values, updated predetermined record-field values, one or more additional data tables, or one or more additional data records. The example method may then also entail determining if any of the updated one or more configuration plugins are already installed in the PA software application, and for each of the one or more configuration plugins that are already installed in the PA software application, installing the respective revised data without overwriting any existing table-entry values or any existing record-field values. As discussed above, this avoids overwriting the customer's configuration with a system update, for example.

In further accordance with example embodiments, the example method may further entail displaying an update alert indicator for each of the one or more configuration plugins for which updated content is available, and receiving, via the GUI, an input causing updating of the content data for the one or more configuration plugins for which updated content is available. This allows a customer to become aware of the availability of configuration updates, and to choose if and when to install those updates.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system for configuring a performance analytics (PA) software application, wherein the system is disposed within a computational instance of a remote network management platform that remotely manages a managed network, the system comprising:
    a database containing a plurality of configuration plugins, each comprising content data for configuring a respective key performance indicator (KPI) application module, wherein the content data comprises one or more data tables and one or more data records, wherein each of the one or more data tables comprises table entries with predetermined values and each of the one or more data records comprises fields with predetermined values, wherein each respective KPI application module implements performance analytics applied to an associated KPI of the managed network, and wherein configuring the respective KPI application module specifies a graphical configuration of a dashboard for displaying graphical representations of the associated KPI in a graphical user interface (GUI) within the managed network; and
    a computing device operational to execute both the PA software application and a PA-configuring software program, wherein the PA-configuring software program is configured to:
        display, in the GUI, a gallery of graphical identifiers, each identifying a respective one of the plurality of configuration plugins,
        receive, via the GUI, input selecting one of the graphical identifiers, the selected graphical identifier identifying a particular configuration plugin,
        install in the PA software application, via a common plugin interface, the particular configuration plugin,
        configure a particular KPI application module corresponding to the particular configuration plugin by writing the content data of the particular configuration plugin to corresponding data definitions of the particular KPI application module;
        update the content data of one or more configuration plugins of the plurality of configuration plugins in the database with updated content data, wherein for each of the one or more configuration plugins, the updated content data comprises respective revised data, and wherein the respective revised data comprises: updated predetermined table-entry values, updated predetermined record-field values, one or more additional data tables, or one or more additional data records, or a combination thereof;
        determine if any of the updated one or more configuration plugins are already installed in the PA software application; and
        install the updated content data without overwriting any existing table-entry values or any existing record-field values for each of the one or more configuration plugins that are already installed in the PA software application.

2. The system of claim 1, wherein each of the graphical identifiers is displayed in the gallery with accompanying information descriptive both of an identified configuration plugin and of a KPI and KPI application module corresponding to the identified configuration plugin, the accompanying information comprising a text description of the corresponding KPI and KPI application module, a graphical representation of the corresponding KPI and KPI application module, or a combination thereof.

3. The system of claim 1, wherein the PA-configuring software program is configured to:
    prior to installing the particular configuration plugin, identify the particular KPI application module based on the particular configuration plugin; and
    determine if the particular KPI application module is an authorized extension of the PA software application for the computational instance of the remote network management platform.

4. The system of claim 1, wherein the PA-configuring software program is configured to:
    prior to displaying the gallery of graphical identifiers, determine which configuration plugins of the plurality correspond to KPI application modules that are authorized extensions of the PA software application for the computational instance of the remote network management platform; and
    include in the gallery only graphical identifiers associated with the authorized extensions.

5. The system of claim 4, wherein data dependencies among those configuration plugins of the plurality that correspond to KPI application modules that are authorized extensions of the PA software application are resolved prior to installation of any one of those configuration plugins,
    and wherein the particular configuration plugin being installed comprises discovery of at least one of the resolved dependencies.

6. The system of claim 4, wherein one or more KPI application modules that are authorized extensions of the PA software application are in a locked state that prevents their corresponding configuration plugins from being installed,
    and wherein the PA-configuring software program is configured to:
    provide a software key for unlocking locked KPI application modules, wherein unlocking a locked KPI application module enables its corresponding configuration plugin to be installed; and
    receive, via the GUI, an input applying the software key to at least one of the one or more locked KPI application modules.

7. The system of claim 1, wherein the computational instance of the remote network management platform that remotely manages a managed network implements at least a first security tier of access for administrative users and a second security tier of access for non-administrative users, the first security tier requiring a higher level of access privileges than the second security tier,
    and wherein the second tier of security access is sufficient for installation of the particular configuration plugin.

8. The system of claim 1, wherein the PA-configuring software program is configured to:
    display an update alert indicator for each of the one or more configuration plugins for which updated content is available; and
    receive, via the GUI, an input causing updating of the content data for the one or more configuration plugins for which updated content is available.

9. A method for configuring a performance analytics (PA) software application, wherein the method is carried out by a computing device disposed within a computational instance of a remote network management platform that remotely manages a managed network, and wherein the computing device is operational to execute the PA software application, the method comprising:
    in a graphical user interface (GUI) within the managed network, displaying a gallery of graphical identifiers, each identifying a respective one of a plurality of configuration plugins contained in a database disposed within the computational instance of the remote network management platform, wherein each of the plurality of configuration plugins comprises content data for configuring a respective key performance indicator (KPI) application module of the PA software application, wherein the content data comprises one or more data tables and one or more data records, wherein each of the one or more data tables comprises table entries with predetermined values and each of the one or more data records comprises fields with predetermined values, wherein each respective KPI application module implements performance analytics applied to an associated KPI of the managed network, and wherein configuring the respective KPI application module specifies a graphical configuration of a dashboard for displaying graphical representations of the associated KPI in the GUI;

receiving, via the GUI, input selecting one of the graphical identifiers, the selected graphical identifier identifying a particular configuration plugin;

installing in the PA software application, via a common plugin interface, the particular configuration plugin;

configuring a particular KPI application module corresponding to the particular configuration plugin by writing the content data of the particular configuration plugin to corresponding data definitions of the particular KPI application module;

updating the content data of one or more configuration plugins in the database with updated content data, wherein for each of the one or more configuration plugins, the updated content data comprises respective revised data, wherein the respective revised data comprises: updated predetermined table-entry values, updated predetermined record-field values, one or more additional data tables, or one or more additional data records, or a combination thereof;

determining if any of the updated one or more configuration plugins are already installed in the PA software application; and installing the respective revised data without overwriting any existing table-entry values or any existing record-field values for each of the one or more configuration plugins that are already installed in the PA software application.

10. The method of claim 9, wherein displaying the gallery of graphical identifiers comprises displaying each of the graphical identifiers with accompanying information descriptive both of an identified configuration plugin and of a KPI and KPI application module corresponding to the identified configuration plugin, the accompanying information comprising: a text description of the corresponding KPI and KPI application module, a graphical representation of the corresponding KPI and KPI application module, or a combination thereof.

11. The method of claim 9, comprising:

prior to installing the particular configuration plugin, identifying the particular KPI application module based on the particular configuration plugin; and determining if the particular KPI application module is an authorized extension of the PA software application for the computational instance of the remote network management platform.

12. The method of claim 9, comprising:

prior to displaying the gallery of graphical identifiers, determining which configuration plugins of the plurality correspond to KPI application modules that are authorized extensions of the PA software application for the computational instance of the remote network management platform; and including in the gallery only graphical identifiers associated with the authorized extensions.

13. The method of claim 12, wherein data dependencies among those configuration plugins of the plurality that correspond to KPI application modules that are authorized extensions of the PA software application are resolved prior to installation of any one of those configuration plugins, and wherein the particular configuration plugin being installed comprises discovering at least one of the resolved dependencies.

14. The method of claim 12, wherein one or more KPI application modules that are authorized extensions of the PA software application are in a locked state that prevents their corresponding configuration plugins from being installed, and wherein the method comprises:

providing a software key for unlocking locked KPI application modules, wherein unlocking a locked KPI application module enables its corresponding configuration plugin to be installed; and receiving, via the GUI, an input applying the software key to at least one of the one or more locked KPI application modules.

15. The method of claim 9, wherein the computational instance of the remote network management platform that remotely manages a managed network implements at least a first security tier of access for administrative users and a second security tier of access for non-administrative users, the first security tier requiring a higher level of access privileges than the second security tier, and wherein the second tier of security access is sufficient for installing the particular configuration plugin.

16. The method of claim 9, comprising:

displaying an update alert indicator for each of the one or more configuration plugins for which updated content is available; and receiving, via the GUI, an input causing updating of the content data for the one or more configuration plugins for which updated content is available.

17. An article of manufacture including a non-transitory computer-readable medium having stored thereon program instructions for configuring a performance analytics (PA) software application, wherein a computing device operational to execute the PA software application is disposed within a computational instance of a remote network management platform that remotely manages a managed network, and wherein the program instructions, upon execution by the computing device, cause the computing device to perform operations comprising:

in a graphical user interface (GUI) within the managed network, displaying a gallery of graphical identifiers, each identifying a respective one of a plurality of configuration plugins contained in a database disposed within the computational instance of the remote network management platform, wherein each of the plurality of configuration plugins comprises content data for configuring a respective key performance indicator (KPI) application module of the PA software application, wherein the content data comprises one or more data tables and one or more data records, wherein each of the one or more data tables comprises table entries with predetermined values and each of the one or more data records comprises fields with predetermined values, wherein each respective KPI application module implements performance analytics applied to an associated KPI of the managed network, and wherein configuring the respective KPI application module specifies a graphical configuration of a dashboard for displaying graphical representations of the associated KPI in the GUI;

receiving, via the GUI, input selecting one of the graphical identifiers, the selected graphical identifier identifying a particular configuration plugin;

installing in the PA software application, via a common plugin interface, the particular configuration plugin, configuring a particular KPI application module corresponding to the particular configuration plugin by writing the content data of the particular configuration plugin to corresponding data definitions of the particular KPI application module;

updating the content data of one or more configuration plugins in the database with updated content data, wherein for each of the one or more configuration plugins, the updated content data comprises respective revised data, wherein the respective revised data comprises: updated predetermined table-entry values, updated predetermined record-field values, one or more additional data tables, or one or more additional data records, or a combination thereof;

determining if any of the updated one or more configuration plugins are already installed in the PA software application; and installing the respective revised data without overwriting any existing table-entry values or any existing record-field values for each of the one or more configuration plugins that are already installed in the PA software application.

18. The article of manufacture of claim 17, wherein the PA-configuring software program is configured to:
prior to displaying the gallery of graphical identifiers, determine which configuration plugins of the plurality correspond to KPI application modules that are authorized extensions of the PA software application for the computational instance of the remote network management platform; and
include in the gallery only graphical identifiers associated with the authorized extensions.

19. The article of manufacture of claim 18, one or more KPI application modules that are authorized extensions of the PA software application are in a locked state that prevents their corresponding configuration plugins from being installed,
and wherein the PA-configuring software program is configured to:
provide a software key for unlocking locked KPI application modules, wherein unlocking a locked KPI application module enables its corresponding configuration plugin to be installed; and
receive, via the GUI, an input applying the software key to at least one of the one or more locked KPI application modules.

20. The article of manufacture of claim 17, wherein the PA-configuring software program is configured to:
display an update alert indicator for each of the one or more configuration plugins for which updated content is available; and
receive, via the GUI, an input causing an update of the content data for the one or more configuration plugins for which updated content is available.

* * * * *